United States Patent

Gosnell

[15] 3,645,204

[45] Feb. 29, 1972

[54] METHODS OF PREPARING AND COMPOSING RELIEF PRINTING MEMBER

[72] Inventor: Earl J. Gosnell, Rochester, N.Y.

[73] Assignee: Burroughs Corporation, Detroit, Mich.

[22] Filed: Sept. 15, 1967

[21] Appl. No.: 668,133

[52] U.S. Cl. ......................... 101/401.1, 250/65 T, 101/395, 101/369

[51] Int. Cl. ......................... B41c, B41n

[58] Field of Search ......................... 96/35.1, 36.3; 156/7, 14; 101/128.2, 395, 401.1; 250/65.1

[56] References Cited

UNITED STATES PATENTS

| | | | |
|---|---|---|---|
| 2,760,863 | 8/1956 | Plambeck | 96/35.1 |
| 2,808,777 | 10/1957 | Roshkind | 101/128.2 |
| 2,875,051 | 2/1959 | De Maria | 96/36.3 X |
| 2,893,868 | 7/1959 | Barney | 96/36.3 X |
| 3,122,997 | 3/1964 | Raczynski et al. | 250/65.1 X |
| 3,217,643 | 11/1965 | Crissy et al. | 101/401.1 |
| 3,223,838 | 12/1965 | Hoshino et al. | 250/65.1 |
| 3,305,359 | 2/1967 | Delmont | 96/35.1 X |

*Primary Examiner*—David Klein
*Attorney*—Kenneth L. Miller and Wallace P. Lamb

[57] ABSTRACT

An improved latently composable printing member and methods of preparing and composing the same. A heat sensitive polymer dispersion coating on a dimensionally stable base is placed in thermal contact with infrared absorbing indicia. Selective heating of the coating through the application of near infrared radiation to the absorbing indicia causes the polymer dispersion coating to form an insoluble solid solution in a pattern corresponding to the indicia on the master. The portions of the coating which do not form a solid solution are washed off the base with a solvent to form a relief printing plate.

11 Claims, 14 Drawing Figures

INVENTOR.
EARL J. GOSNELL
BY
Wallace P. Lamb
ATTORNEY.

INVENTOR.
EARL J. GOSNELL.
BY
ATTORNEY.

METHODS OF PREPARING AND COMPOSING RELIEF PRINTING MEMBER

SUMMARY OF THE INVENTION

The present invention relates to low cost easily prepared relief printing plates and to a method of rapidly and inexpensively preparing and composing the relief printing plates. More particularly, the present invention relates to relief printing members and to methods for preparing said members and for composing and producing relief printing plates from the printing members.

In the past, relief printing plates have usually been made by setting lead or rubber type in a matrix which supports and aligns the individual type segments. The process is very time consuming and requires skilled operators. Furthermore, the process is all but useless if it is desired to print a signature or other unconventional item in view of the time required to prepare the specific printing plate.

Relief printing plates have also been made through photoengraving techniques. The photoengraving process, however, suffers from the disadvantages of requiring large amounts of photographic and photo processing equipment as well as acid etching equipment. Furthermore, in view of the light sensitivity of the materials, special lighting is necessary and special processing techniques must be employed requiring skilled operators.

The choice of process to be used in making the relief printing plate is also dependent on economic considerations. A bank, for example, would not be inclined to use photoengraving techniques for preparing the printing plates used in personalizing checks in view of the large amount of equipment required. On the other hand, banks have chosen to use a simplified-type setting process utilizing hand set type.

Since the hand setting of type is still relatively expensive in view of the time and expense necessary to train operators to be skilled-type setters and in view of the time required to compose a printing plate, banks usually save each printing plate for use again when the customer needs another order of checks. In large banks with many customers, the storage of the printing plates presents a serious problem due to both the bulk of the printing plates and the weight of the plates. A rapidly composable, lightweight inexpensive printing plate which can be saved or destroyed after use would greatly reduce the expense of personalizing checks.

Many banks do a considerable business in selling checks to people for use in safeguarding their money while traveling. On most of these checks the signature of the purchaser is written and is then used to provide subsequent identification when the check is cashed. Each check purchased must be signed by the purchaser; and if many checks are purchased, the signing of each check tends to be irritating to the customer. It would, therefore, be very desirable for the bank to have a rapid means of reproducing the customer's signature in a printing plate which could then be used to print on each check. In view of the limited, almost certain one time use of the printing plate, it would be desirable to have an inexpensive rapidly composable printing plate which could be destroyed after use. A plastic printing plate, for example, would be very inexpensive.

In the patents to J. De Maria, U.S. Pat. No. 2,875,051, issued Feb. 24, 1959, and U.S. Pat. No. 2,977,227, issued Mar. 28, 1961, both patents being assigned to the Chemical Products Corporation of East Providence, Rhode Island, there are disclosed a relief printing plate and process for preparing a relief printing plate, respectively. The relief printing plate taught by De Maria comprises a plastic base sheet upon which a polyvinyl plastisol is coated. The plastisol is then coated with a metallic infrared reflective layer, for example, aluminum, and then a layer of photosensitive resist material. The printing plate is prepared by exposing the photosensitive sheet through a positive transparency, or by reflecting light from a positive print in a photographic apparatus followed by development of the image to remove the unaffected portions of the resist material from the infrared reflective metallic layer. An acid etching technique is then employed to remove the metallic layer from selected areas. The etched sheet is then exposed to a source of infrared radiation to make the plastisol fuse in the exposed areas. The remaining infrared reflective material and unreacted plastisol are then removed from the base to form a relief printing plate. It is obvious that while a plastic relief printing plate is formed, the process for preparing the plate is even more time consuming and involved than the conventional photoengraving techniques and requires all of the same equipment as well as equipment for thermally treating the plate and for washing the plate.

In the patent to Hoshino et al., U.S. Pat. No. 3,223,838, issued Dec. 14, 1965 and assigned to Konishiroku Photo Industry Co., Ltd., Tokyo, Japan, a corporation of Japan, there is disclosed another method for the preparation of plastic printing plates. Hoshino et al., employ a solid organic compound, usually an acid, dispersed in a polymeric binder. Through selective heating of the coating, the solid organic acid fuses with the polymeric binder to form areas which are insoluble in a solvent for the polymeric binder. The selective heating is carried out by employing a master containing heat absorbing indicia and an infrared source. The amount of relief obtainable in the finished printing plate, 3–10 microns, is too shallow and fragile for use in letterpress printing applications or for use with transfer ribbons, carbon papers or by any conventional printing means. Furthermore, and a most important consideration, the relief image is still readily soluble in numerous solvents necessitating great care in the selection of the type of ink or dye compositions to be used with the printing plate.

BRIEF DESCRIPTION OF INVENTION

In accordance with the present invention, a relief printing member for reproducing both hand and machine encoded information is provided which can be prepared quickly and inexpensively by unskilled personnel using a minimum amount of equipment. The printing plate is prepared from a base sheet coated with a heat sensitive polymer dispersion composition. The coating is placed in thermal contact with infrared absorbing data which is applied either directly to the coating, to a base sheet, or on a translucent master sheet, for example, a conventional typed page or a sheet of translucent paper containing a signature or other hand written data. The encoded base sheet or base sheet-master sheet combination is then exposed to infrared radiation which causes the polymer dispersion coating to undergo local heating in the areas in thermal contact with the infrared absorbing data. The heated polymer coating forms an insoluble solid solution in the areas where it is selectively heated with the remaining coating being readily removed by solvents to form the relief printing plate. The finished relief printing plate while very inexpensive and well adapted for one time use is at the same time capable of producing well in excess of one thousand high quality impressions without visible sign of print deterioration.

It is an object of the present invention to provide a latently composable printing member which can be quickly and inexpensively converted into a relief printing member.

It is another object of the present invention to provide a rapid process for the inexpensive preparation of a latently composable printing member.

It is a further object of the present invention to provide a rapid and inexpensive method of data reproduction.

It is yet another object of the present invention to provide a process for the rapid preparation of relief printing plates which requires a minimum amount of equipment.

It is still another object of the present invention to provide a process for the preparation of relief printing plates by relatively unskilled personnel in office areas.

It is another and still further object of the present invention to provide a process for the preparation of relief printing plates incorporating both hand and machine inscribed data.

BRIEF DESCRIPTION OF THE DRAWINGS

The invention, both as to its organization and method of operation, together with further objects and advantages thereof, will best be understood by reference to the following detailed description taken in connection with the accompanying drawings, in which.

DETAILED DESCRIPTION OF THE INVENTION

Figures 1, 2, 3, 4, 5:
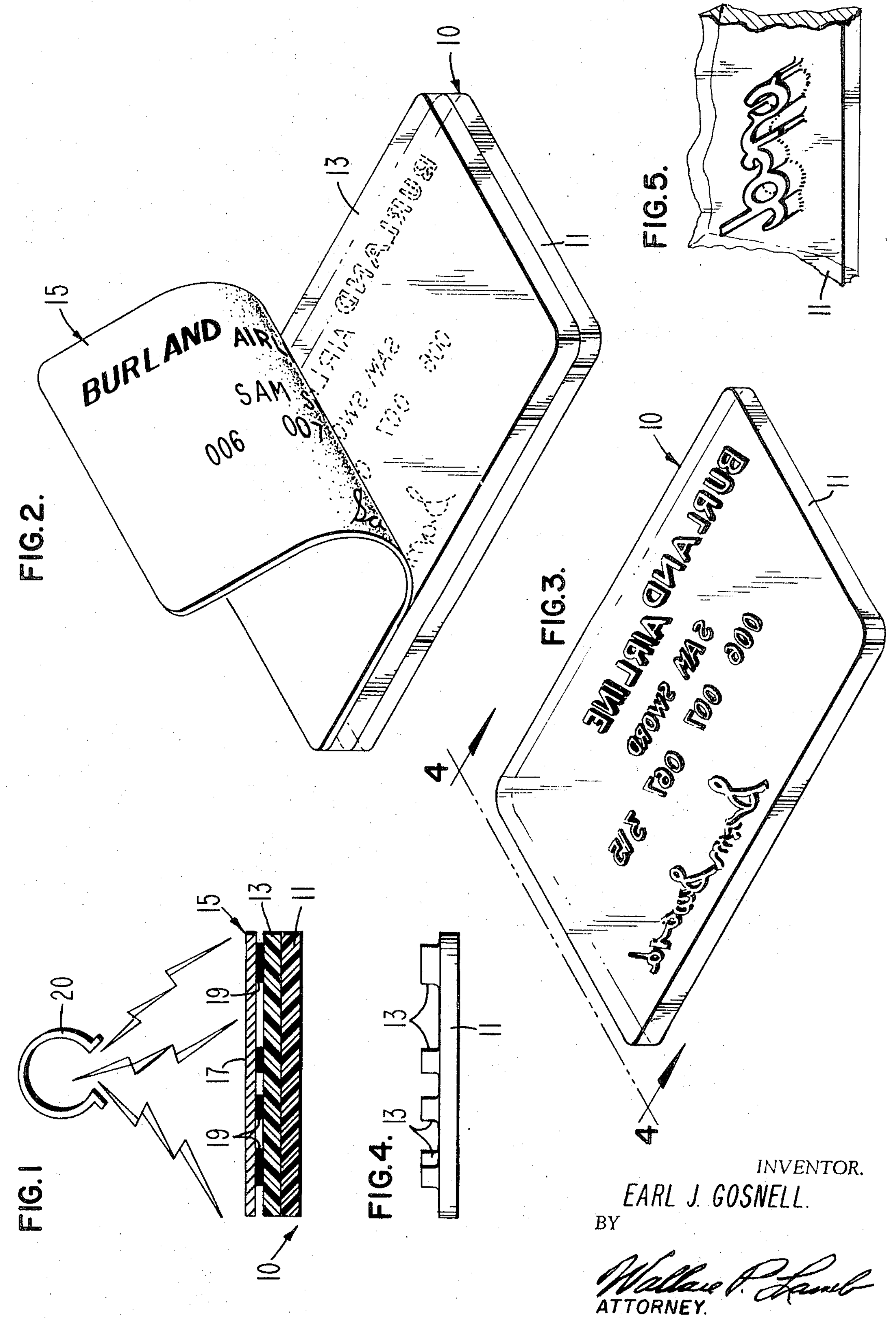
FIG. 1 is a schematic illustration showing the arrangement of a master sheet and a latently composable printing member during an infrared exposure step of a process of the present invention.
FIG. 2 is an isometric view illustrating the removing of the master sheet following exposure to infrared radiation and showing the transparent image formed on the surface of the printing member.
FIG. 3 is an isometric view of the finished relief printing plate containing both machine and hand inscribed data.
FIG. 4 is an end elevational view of the relief printing plate of FIG. 3 taken in the direction of the line 4—4 and showing the height of the relief image found.
FIG. 5 is an enlarged fragmentary view of a portion of the relief printing plate of FIG. 3 showing the relief present in the signature on the plate.

Referring to FIG. 1, the latently composable relief printing member of the present invention, indicated generally by the numeral 10, comprises a base sheet 11 having a coating 13 on the surface thereof. The base sheet 11 can be made of planished, smooth or uniform caliper plastic and preferably a plastic that is dimensionally stable over the operating temperature range of the process. Several plastic materials have been found suitable, for example:

a. vinyl chloride-acetate copolymers with a vinyl acetate content of 5–20 percent,
b. polyvinyl chloride,
c. polyvinylidene chloride
d. vinylidene chloride copolymers with acrylonitrile or vinylchloride or acrylate esters,
e. polyvinyl formal, acetal and butral,
f. acrylate and methacrylate ester polymers,
g. ethyl cellulose,
h. polycarbonates.
i. cellulose acetate-butyrate, and
j. cellulose propionate.

Other materials have also been found suitable such as metal, metal foil, metal foil laminated paper or board, plastic coated paper or board and plastic coated fabric. The preferred material for use as the base sheet is a nonoriented vinyl chloride homopolymer.

The base sheet can be almost any thickness, however, practical limits of 0.003 to 0.060 inch are usually observed. The thickness is in part determined by the application to which the resulting printing plate is to be placed. If the plate is to be used on a press where it is supported throughout its length, the base can be relatively thin. On the other hand, if the relief printing plate is to be used as a credit card, then it should be quite thick in order to be self-supporting and able to withstand the normal abuse to which credit cards are placed. The base should also be resistant to dimensional distortion and absorption of materials from the coating at temperatures below the final imaging temperatures.

The heat sensitive polymer dispersion coating 13 should be as thick as the amount of relief desired in the printing plate. For most applications the coating would be within the working limits of 0.002 to 0.010 inch. The preferred coating thickness is in the range of 0.004 to 0.005 inch. The polymer dispersion is a moderately viscous nontacky and self-leveling fluid which should be free from dust, fibers and occluded air bubbles.

The coating used in the present invention can consist of a dispersion of a solid resinous material in a mixture of solid or liquid plasticizer and a liquid polyfunctional monomer of low-vapor pressure which has the ability to cross-link during polymerization. The dispersion resin should be in a finely divided form with a particle size between 0.1 and 10 microns and preferably between 0.5 to 1.5 microns. The dispersion resin should be uniformly dispersed throughout the mixture of plasticizer and liquid monomer along with a catalyst and any fillers, wetting agents and leveling agents needed to provide the rheological properties necessary for coating. A trace of dye can also be added to the composition to facilitate examination and inspection of the coating providing a dye is selected so as to be noninfrared absorbing.

The dispersion coating undergoes distinct property changes on heating. When originally prepared for coating, the composition is a moderately viscous nontacky liquid. After application to a base sheet and heating to a first pregelling temperature, the dispersion resin absorbs some of the liquid plasticizer and plasticizing monomer which causes the resin particles to swell and lock together forming a dry coating. On heating to a second higher temperature, the plasticizer and monomer dissolve the dispersion resin and the catalyst initiates polymerization and cross linking of the polyfunctional liquid monomer to form a solid, solvent insoluble solution.

The dispersion resins used in preparing the heat sensitive coatings of the present invention should be in a finely divided form and capable of forming stable dispersions in compatible liquid plasticizers. Resin particles between 0.1 and 10 microns are suitable with 0.5 to 1.5 microns the preferred size. The following are representative resins for use either singly or in combination in preparing the heat sensitive dispersion coatings of the present invention:

a. vinyl chloride
b. copolymers of vinyl chloride and vinylidene chloride
c. acrylic resins
d. polyolefins
e. polyvinyl fluorides
f. polyvinyl chloro fluorides
g. vinyl chloride maleic ester copolymers
h. copolymers of vinyl chloride and vinyl acetate The preferred resin for use in preparing the heat sensitive dispersion of the present invention is the vinyl chloride in view of its ready availability and low cost.

The plasticizer-monomer mixture employed in the coating composition of the present invention should have the following properties: (1) nonvolatility at ambient conditions and at temperature of pregelling, (2) nonsolvency for the dispersion resin at room ambient temperatures, (3) moderate solvency for the dispersion resin at selected pregelling (210°–230° F.) temperatures, (4) high solvency for the dispersion resin at high (350° F. +) temperatures, (5) nonsolvency for a plastic base sheet at room temperatures, (6) high solvency for a plastic base sheet at (350° F. +) temperatures, and (7) the ability to cross link to become a solvent insoluble polymer at the higher (350° F. +) temperatures. Substitution for the monomer of a plasticizer having the first six characteristics but being unpolymerizable, will also give satisfactory results but requires considerably greater control of the composition steps in view of the small margin of difference in solvent solubility between the imaged and nonimaged areas of the unpolymerized coating.

The following are representative examples of plasticizers suitable for use in compounding the coating compositions of the present invention:

a. Phthalate esters
 diethyl
 di n-butyl
 di isohexyl
 di 2-ethylhexyl
 di isononyl
 di isodecyl
 di isoundecyl
 di isotridecyl
 diphenyl
 dicapryl
 di 2-propylheptyl
 dicyclohexyl
 di n-hexyl
 butyl 2-ethylhexyl
 2-ethylhexyl isodecyl
 isohexyl isodecyl
 2-methylpentyl isodecyl
 butyl cyclohexyl
 butyl benzyl
 n-octyl n-decyl
b. Isophthalate esters
 di 2-ethylhexyl
 di isodecyl
 di isononyl
 butyl 2-ethylhexyl
 2-ethylhexyl isodecyl
c. Terephthalate esters
 2-ethylhexyl
d. Adipate esters
 di isodecyl
 di 2-ethylhexyl
 di isononyl
 dioctyl
e. Azelate esters
 di 2-ethylhexyl
 dioctyl
f. Sebacate esters
 dibenzyl
 di 2-ethylhexyl
 butyl
 dioctyl
g. Phosphate esters
 tricresyl
 cresyl diphenyl
 2-ethylhexyl diphenyl
 didecyl cresyl
 di-2-ethylhexyl phenyl
 tri-2-ethylhexyl
 tri-n-butyl
 triphenyl
h. Dibenzoate esters
 diethylene glycol
 dipropylene glycol
 polyethylene glycol
 octylene glycol
 3-methyl-1,5-pentanediol
i. Citrate esters
 acetyl tributyl
 acetyl tri-2-ethylhexyl
j. Glycol esters
 triethylene glycol dihexoate
 triethylene glycol di-2-ethylhexoate
 polyethylene glycol di-2-ethylhexoate
 diethylene glycol dipelargonate
k. Epoxidized soybean oil The plasticizers can be used singly or mixtures of the plasticizers can be used to produce particular properties.

The polymerizable monomer used in the coating composition should be a polyfunctional monomeric liquid of low vapor pressure having the ability to cross link during polymerization under the influence of catalysis initiated by heat. The following materials are representative examples of suitable liquid monomers:

a. 1,3 butylene glycol dimethacrylate
b. trimethylol propane trimethacrylate
c. ethylene glycol dimethacrylate
d. triethylene glycol dimethacrylate
e. tetraethylene glycol dimethacrylate
f. diallyl phthalate
g. diallyl fumarate
h. 1,4 butane diol diacrylate
i. 1,4 butane diol dimethacrylate
j. 1,3 butylene glycol diacrylate
k. cyclohexyl acrylate
l. 1,10 decamethylene glycol dimethacrylate
m. diethylene glycol diacrylate
n. diethylene glycol dimethacrylate
o. 2,2 dimethyl propane diacrylate
p. 2,2 dimethyl propane dimethacrylate
q. glyceryl trimethacrylate
r. 1,6 hexane diol diacrylate
s. 1,6 hexane diol dimethacrylate
t. neopentyl glycol diacrylate
u. neopentyl glycol dimethacrylate
v. polyethylene glycol (200) diacrylate
w. tetraethylene glycol diacrylate
x. triethylene glycol diacrylate
y. 2,2,4 trimethyl-1, 3-pentane diol dimethacrylate
z. trimethylol ethane trimethacrylate
aa. trimethylol propane triacrylate
bb. tripropylene glycol dimethacrylate The following can also be used as polymerizable plasticizer monomers but their polymerized structure is linear and exhibits slight solubility in contrast to the cross-linked polymers:

a. dodecyl methacrylate
b. lauryl methacrylate
c. stearyl methacrylate
d. butyl cellosolve acrylate
e. n-decyl acrylate
f. n-decyl methacrylate
g. 2-ethoxyethyl methacrylate
h. 2-ethyl hexyl methacrylate
i. isononyl methacrylate
j. octadecyl acrylate
k. oleyl methacrylate
l. tetrahydropyranyl methacrylate
m. tridecyl methacrylate
n. 3,5,5 trimethyl hexyl methacrylate
o. 2,2,4-trimethyl pentane diol isobutyrate, 3-methacrylate These, however, can be mixed with the polyfunctional monomers to give copolymers which are insoluble.

The monomer provides a very important function in the exposed printing member in markedly increasing the solvent resistance of the imaged areas of the plate relative to the unimaged areas.

Along with the dispersion resin and plasticizers and monomer, other ingredients such as catalysts, fillers and leveling and wetting agents can be added to the coating composition. Organic peroxide type catalysts, for example, benzoyl peroxide and *t*-butyl peroxide and *t*-butyl perbenzoate are preferred for use in the coating composition in view of their ease of handling and ready availability.

Fillers such as amorphous silica and barium sulfate can be used to add firmness or body to the coating. Wetting agents such as the polyethylene glycol oleates and laurates and leveling agents such as lecithin and nonionic surfactants such as Tenlo-70, which is sold by the Nopco Chemical Co., of Newark, New Jersey, can be added to improve the coating and leveling properties of the dispersion coating.

The following are examples of polymerizable coating compositions suitable for use in preparing the latently composable relief printing members of the present invention. The compositions are expressed in weight percent.

EXAMPLE 1

| | |
|---|---|
| Vinyl chloride resin | 53.80% |
| Triphenyl phosphate | 11.30% |
| Dipropylene glycol dibenzoate | 4.00% |

| | |
|---|---|
| 1,3 butylene glycol dimethacrylate | 30.00% |
| Polyethylene glycol oleate | 0.30% |
| Lecithin | 0.30% |
| t-butyl perbenzoate | 0.30% |

*Other compatible dispersion resins, as previously listed, can be substituted. oleate In preparing the coating composition, the triphenyl phosphate is melted and then poured with stirring into a container holding a mixture of liquid dipropylene glycol dibenzoate and liquid 1, 3 butylene glycol dimethacrylate. The solution is quite viscous so a stirrer should be used that is strong enough to smoothly and thoroughly mix the ingredients without beating or vortexing, which would cause undesired inclusion of air. The remaining ingredients are then added with stirring and mixed. The mixture should then be passed through a three-roll ink mill to break up any agglomerates in the dispersion resin and to remove any air incorporated during the original mixing. The resulting liquid is a stable dispersion of resin in a liquid plasticizer and liquid monomer.

EXAMPLE 2

| | |
|---|---|
| Vinyl chloride resin* | 44.25% |
| Octyl diphenyl phosphate | 8.50% |
| Trimethylol propane triacrylate | 26.50% |
| Tenlo-70 | 0.30% |
| t-butyl peroxide | 9.45% |
| Barium sulfate | 20.00% |

*Other compatible dispersion resins, as previously listed, can be substituted.

Since no solid plasticizer is employed in this example, the liquid materials should be added together and thoroughly mixed. The dispersion resin and inorganic filler are then added with mixing. The dispersion is then passed through a three-roll ink mill to break up any agglomerates of resin and barium sulfate and to remove entrapped air to yield a stable liquid dispersion.

EXAMPLE 3

| | |
|---|---|
| Vinyl chloride resin* | 55.0% |
| Diphenyl phthalate | 13.7% |
| Trimethyl propane trimethacrylate | 31.0% |
| t-butyl perbenzoate | 0.3% |

*Other compatible dispersion resins, as previously listed, can be substituted.

In preparing this composition the diphenyl phthalate is melted and added to the liquid monomer with stirring. The *t*-butyl perbenzoate is then added with stirring along with the dispersion resin. The mix is then passed through a three-roll paint mill to deaerate the mixture and to break up resin agglomerates to yield a stable dispersion.

EXAMPLE 4

| | |
|---|---|
| Vinyl chloride resin* | 50.0% |
| Ethylene glycol dimethacrylate | 51.2% |
| Polyethylene glycol laurate | 0.3% |
| Lecithin | 0.4% |
| Benzoyl peroxide | 0.5% |

*Other compatible dispersion resins, as previously listed, can be substituted.

The several ingredients are mixed as in Example 2 and passed through a three-roll ink mill in order to break up any agglomerates and to deaerate the mixture. In this example, as in all the other examples, precautions should be taken against undue air inclusion during the mixing operation. Occluded air can be essentially removed by allowing it to rise to the surface over a period of 1–2 days and drawing the mix off from the bottom for the milling operation. Vacuum deaeration may also be used.

EXAMPLE 5

| | |
|---|---|
| Vinyl chloride copolymer resin | 61.85% |
| Dicapryl phthalate | 28.00% |
| Stearyl methacrylate | 2.00% |
| Trimethylol propane trimethacrylate | 7.50% |
| Polyethylene glycol monolaurate | 0.25% |
| Tenlo-70 | 0.30% |
| t-butyl hydroperoxide | 0.10% |

The several ingredients should be mixed as in Examples 2 and 4 and then carefully processed to prevent the incorporation of dirt and to remove entrapped air.

After the dispersion composition has been prepared, it is best coated on the base sheet, for example, a vinyl substrate, at a uniform thickness between 0.002 and 0.010 inch and then heated in a hot air oven at a temperature of from 105°–110° C. for 15–20 seconds. Upon heating for this short time, the dispersion resin absorbs the monomer and plasticizer to produce a dry, gelled film but does not dissolve in the plasticizer-monomer mixture, nor does any polymerization take place, nor is the vinyl chloride substrate dissolved or solvated. The coated product at this point is clean to handle and shows no signs of age deterioration.

In order to avoid having relief characters of different heights, it is essential that the vinyl base be of relatively uniform caliper, preferably within ± 0.0005 inch. The coating should also be carefully applied to the base within ± 0.0002 inch. The coating may be applied by means of a reverse roll coater, a knife over roll coater, a knife over flat bed coater or by extrusion.

Referring again to FIG. 1, the latently composable relief printing member 10 is shown in surface contact with a master sheet 15 which comprises a translucent support 17 having near infrared absorbing indicia 19 on the surface thereof. A schematic source of near infrared radiation for use in irradiating the assembled sheets is shown at 20. The sizes of the several sheets and indicia has been greatly exaggerated in order to facilitate illustration of each element. The master sheet 15 is positioned on the relief printing member 10 with the indicia 19 in direct contact with the dispersion coating 13. This orientation of the sheets is preferred, however, the order of the sheets and the orientation of the coatings can be varied if corresponding adjustments are made in the process steps.

The support sheet 17 can be paper upon which the data to be composed 19 is typed or written using carbon or other near infrared absorbing media. The support thickness should not exceed 0.003 inch for best results and preferably 0.002 inch. Although the infrared radiations must penetrate the body of the paper, in the preferred orientation of the relief printing member 10 and master sheet 15, the paper can contain up to 15 percent filler without undue impairment of its functionality.

Paper translucency is commercially achieved by (a) pulp selection, (b) avoiding excessive filler or pigment loading, (c) pulp hydration, and (d) resin impregnation. Any one or all of these variables may be used to obtain a desirable degree of translucency, i.e., less than 85 percent opacity as measured by a Photovolt Opacimeter, manufactured by the Photovolt Corporation of New York, New York. Thicker papers up to 0.007 inch with high degrees of translucency (65 percent opacity), and opaque papers (90 percent opacity) which are less than 0.002 inch thick will work but 0.0015 to 0.003 inch caliper and 50–85 percent opacity are the desirable ranges.

In addition to the above requirements, the paper surface should be level and smooth and of high porosity and accept typing from inked and coated ribbons as well as pencil writing.

After placing the latently composable relief printing member 10 and the master sheet 15, which contains data to be composed, in surface contact, the combined sheets should be exposed to a source of near infrared radiation 20 (7,500 to 30,000 Angstrom units of preferably 8,000 to 18,000 Angstroms) for approximately 2 seconds. A high-intensity source of near infrared radiation is preferred in order to reduce exposure time to a minimum. Quartz tube lamps, for example, the General Electric T2½ and T–3, can be operated to produce a broad range of infrared concentration from 100 watts per linear inch to 400 watts with the near infrared energy concentration increasing with increasing wattage.

In determining the length of exposure time it is best to employ the highest energy source available in order to reduce extraneous heating of the printing member 10. Since in the quartz tube lamp the near infrared energy concentration is proportional to the filament temperature, the quartz envelope itself gets hotter as the amount of near infrared radiation increases and heat conducted through the air can become sufficient to tend to cure the nonimaged areas on the printing member. In exposing apparatus employing the General Electric T–2½ lamp, for example, the Thermofax units sold by Minnesota Mining and Manufacturing and the General Electric T–3 lamp in the Masterfax units sold by Ditto Incorporated, a time of 1–2 seconds appears to be sufficient. Each of the aforementioned units employ a quartz tube lamp with voltages boosted above line to increase the energy output.

Following the infrared exposure of the master sheet 15 and relief printing member 10, the sheets should be separated, FIG. 2 illustrates the separation of the sheets and shows how the appearance of the relief printing member 10 is changed in the imaged areas. Before exposure to infrared, the polymerizable coating 13 is normally translucent and of a uniformly hazy appearance due to the numerous small particles of the dispersion resin. Following exposure to infrared, the imaged areas of the coating become transparent due to the solution of the resin particles in the plasticizer and liquid monomer which also functions initially as a plasticizer.

The portions of the coating 13 which have not been imaged during the exposure to infrared can now be washed from the surface of the base sheet 11 to form the relief image. Several solvents are available for washing away the unpolymerized material, for example, diacetone alcohol, butyl Carbitol, diethylene glycol monoethyl ether, methyl Cellosolve, tetrahydrofurfuryl alcohol, p-cymene, ethyl and diethylbenzene, toluene and xylene. The solvent selected for use in washing the plate should be compatible with the plastic base sheet over the period of time necessary to clean the plate. For example, with a polyvinyl chloride base sheet, diacetone alcohol and tetrahydrofurfuryl alcohol are preferred. The washing can be carried out in a number of ways, for example, by simply flushing the surface with solvent, by mechanical scrubbing along with the application of solvent and by ultrasonic cleaning. The latter method is preferred in view of the increased speed and thoroughness of cleaning.

In FIG. 3 there is shown the finished relief printing plate as composed and ready for printing. The printing plate has both machine encoded data and a hand written signature and is ready for use as a printing plate in a simple letterpress. The plate shown is representative of an employee identification card; however, it is obvious that other relief images can also be prepared, for example, a signature plate can be prepared for printing on checks or other items.

The amount of relief formed in the image is illustrated in FIG. 4, which is an end elevational view of the printing plate of FIG. 3, and in FIG. 5, which is a fragmentary portion of the printing plate. As can be seen in FIG. 5, the signature on the plate has been reproduced exactly in relief and can now be used for printing on numerous documents.

It should be noted that the process steps necessary to prepare a printing plate can be carried out by untrained personnel in an office in a minimum amount of time, in the order of 2–3 minutes. The only piece of equipment essential to the preparation of the printing plate is a source of high-energy infrared radiation.

The latently composable printing member of the present invention can be used to prepare either a right reading or a reverse reading relief printing plate, the right reading printing plate being suitable for letterpress use with the reverse reading plate being suitable for offset printing.

Figures 6, 7, 8, 9, 10, 11, 12, 13, 14:
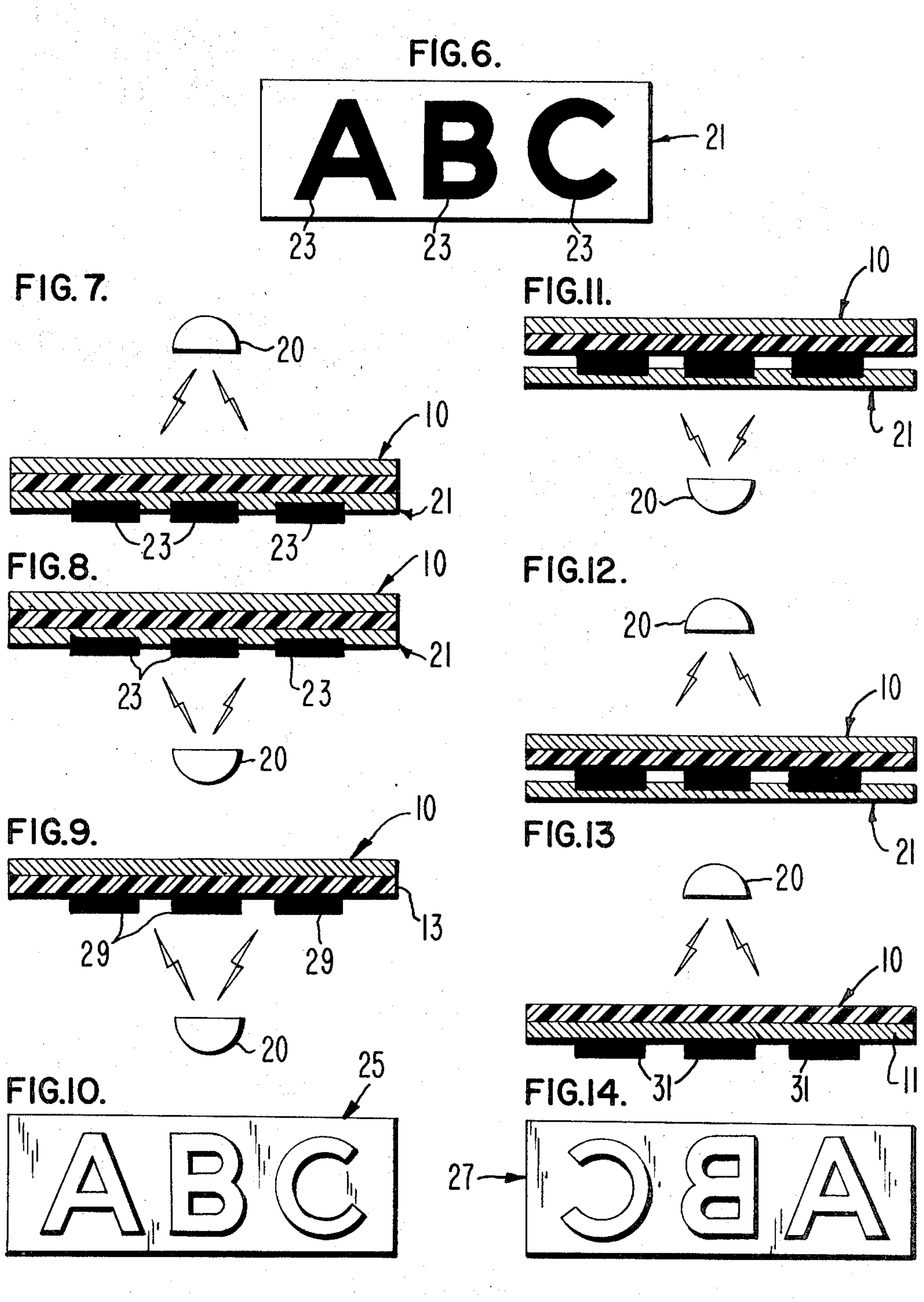
FIG. 6 is an illustration of a master sheet having near infrared absorbing indicia thereon which can be used in the preparation of either a right reading or reverse reading printing plate according to the present invention.
FIGS. 7 and 8 are sectional views illustrating the positioning of the latently composable printing member and master sheet in preparing a right reading printing plate according to processes of the present invention.
FIG. 9 is a sectional view illustrating the direct preparation of a right reading printing plate according to a process of the present invention.
FIG. 10 is an illustration of a right reading printing plate prepared according to the processes of the present invention illustrated in FIGS. 7, 8, and 9.
FIGS. 11 and 12 are sectional views illustrating the positioning of the latently composable printing member and master sheet in preparing a reverse reading printing plate according to processes of the present invention.
FIG. 13 is a sectional view illustrating the direct preparation of a reverse reading printing plate according to a process of the present invention.
FIG. 14 is an illustration of a reverse reading printing plate prepared according to the processes of the present invention illustrated in FIGS. 11, 12, and 13.

Referring to FIG. 6, a master sheet 21 is shown having near infrared absorbing indicia 23 thereon. By arranging the master sheet 21 with the printing member 10 and exposing the combination to near infrared radiation from a source 20, as shown in FIGS. 7 and 8, it is possible to prepare the right reading printing plate 25 shown in FIG. 10.

A reverse reading relief printing plate 27, FIG. 14, can be prepared by arranging the master sheet 21, printing member 10 and near infrared source 20, as shown in FIGS. 11 and 12.

A right or reverse reading printing plate can also be prepared directly without using the master sheet 21. In FIG. 9, indicia 29 is applied directly to the surface of the coating 13 on printing member 10. Care must be taken in applying the indicia 29 to the coating 13 since the heat sensitive coating is relatively soft in the pregelled state. The directly encoded printing member 10 is then exposed to near infrared radiation and washed with a solvent to form a right reading or offset printing plate.

Referring to FIG. 13, a reverse reading or letterpress printing plate can be prepared by applying indicia 31 directly to the surface of the base sheet 11. The encoded printing member is then exposed to infrared radiation and washed with a solvent for the unreacted coating to form a reverse reading plate similar to 27 in FIG. 14.

It will be apparent that many changes and modifications of the several features described herein may be made without departing from the spirit and scope of the invention. It is, therefore, apparent that the foregoing description is by way of illustration of the invention rather than limitation of the invention.

While there has been described what are at present considered to be the preferred embodiments of the invention, it will be understood that various modifications may be made therein which are within the true spirit and scope of the invention as defined in the appended claims.

I claim:

1. A latently composable printing member comprising, a supporting substrate, and a heat-sensitive nonnear-infrared-absorbing, polymer dispersion coating on said substrate, said dispersion coating consisting of a dry, gelled film having a thickness in the range of 0.002–0.010 inch, comprising a finely divided resin substantially uniformly dispersed in a mixture of a plasticizer for said resin and a polymerizable liquid monomer, said mixture of plasticizer and liquid monomer being present in an amount sufficient to dissolve said resin and form a substantially insoluble solid solution on complete solvation of the dispersion resin and polymerization of the monomer at elevated temperatures.

2. A latently composable printing member according to claim 1, wherein said finely divided resin is selected from the group consisting of:

vinyl chloride,
copolymers of vinyl chloride and vinylidene chloride,
acrylic resins,
polyolefins,
polyvinyl fluorides,
polyvinyl chloro fluorides,
vinyl chloride maleic ester copolymers,
vinyl chloride acetate copolymers, and mixtures thereof.

3. A latently composable relief printing plate assembly comprising, a first member including a substrate having thereon a nonnear-infrared-absorbing polymer dispersion coating consisting of a dry, gelled film having a thickness in the range of 0.002–0.010 inch, comprising a finely divided resin substantially uniformly dispersed in a plasticizer for said resin, said plasticizer being present in an amount sufficient to dissolve said resin and form a substantially insoluble solid solution on complete solvation of the dispersion resin at elevated temperatures, and a second member positioned over said first member, comprising a substrate essentially transparent to near-infrared energy capable of having near-infrared absorbent indicia deposed thereon.

4. A latently composable relief printing plate assembly comprising, a first member including a substrate having thereon a nonnear-infrared-absorbing polymer dispersion coating consisting of a dry, gelled film having a thickness in the range of 0.002–0.010 inch, said dry, gelled film comprising a finely divided resin substantially uniformly dispersed in a mixture of a plasticizer for said resin and a polymerizable liquid monomer, said mixture of plasticizer and liquid monomer being present in an amount sufficient to dissolve said resin and form a substantially insoluble solid solution on complete solvation of the dispersion resin and polymerization of the monomer at elevated temperatures, and a second member positioned over said first member, comprising a substrate essentially transparent to near-infrared energy capable of having near-infrared absorbent indicia deposited thereon.

5. A method of preparing a plate for use in composing a relief printing member comprising, providing a dimensionally stable support base, coating said base with a heat-sensitive nonnear-infrared-absorbing polymer dispersion composition comprising a finely divided resin substantially uniformly dispersed in a mixture of a plasticizer for said resin and a polymerizable liquid monomer, said mixture of plasticizer and liquid monomer being present in an amount sufficient to dissolve said resin and form a substantially insoluble solid solution on complete solvation of the dispersion resin and polymerization of the monomer at elevated temperatures, and heating said dispersion resin coating to form a dry, gelled film having a thickness in the range of 0.002–0.010 inch.

6. A method of preparing a relief printing plate comprising, coating a base with a heat-sensitive, nonnear-infrared-absorbing dispersion resin composition, gelling the dispersion resin composition to form a dry stable coating having a thickness in the range of 0.002–0.010 inch, providing a master from which a relief printing plate is to be prepared having indicia thereon capable of absorbing near-infrared radiation, positioning the master on the coated base with the indicia in thermal contact with the resin dispersion, exposing the base and master sheet to a source of near-infrared radiation to form a substantially insoluble solid solution of the dispersed resin in areas in thermal contact with said indicia, separating the base and master sheets, and removing the heat sensitive resin dispersion from the base sheet in areas not previously in contact with the indicia on the master, to form a relief printing plate.

7. A method of preparing a relief printing plate comprising, coating a base sheet with a heat-sensitive, nonnear-infrared-absorbing dispersion resin composition, gelling the dispersion resin composition to form a dry stable coating having a thickness in the range of 0.002–0.010 inch, encoding indicia to be reproduced on the coated base sheet in an infrared absorbing material, exposing the encoded sheet to a source of near-infrared radiation to form a substantially insoluble solid solution of the dispersed resin in areas in thermal contact with said indicia, and removing the heat sensitive resin dispersion from the base sheet in areas not encoded with infrared absorbing material to form a relief printing plate.

8. A method of composing a relief printing plate comprising, providing a latently composable printing member comprising a substrate having thereon a nonnear-infrared-absorbing polymer dispersion coating consisting of a dry, gelled film having a thickness in the range of 0.002–0.010 inch, comprising a finely divided resin substantially uniformly dispersed in a plasticizer for said resin, said plasticizer being present in an amount sufficient to dissolve said resin and form a substantially insoluble solid solution on complete solvation of the dispersion resin at elevated temperature, placing a master sheet having infrared absorbing indicia thereon in thermal contact with said composable printing member, exposing said master sheet and printing member while in thermal contact to a source of infrared radiation to form a substantially insoluble solid solution of said polymer dispersion in areas in thermal contact with said indicia, separating said master sheet from said composable printing member, and removing the coating from said composable printing member in areas not in thermal contact with the indicia on said master sheet to leave a relief printing pattern corresponding to the indicia on said master sheet.

9. The method in accordance with claim 8, wherein the step of removing portions of the coating is accomplished by dissolving the coating in areas not in thermal contact with the indicia.

10. A method of composing a relief printing plate comprising, providing a latently composable printing member comprising a substrate having thereon a nonnear-infrared-absorbing polymer dispersion coating consisting of a dry, gelled film having a thickness in the range of 0.002—0.010 inch, comprising a finely divided resin substantially uniformly dispersed in a plasticizer for said resin, said plasticizer being present in an amount sufficient to dissolve said resin and form a substantially insoluble solid solution on complete solvation of the dispersion resin at elevated temperatures, applying indicia to the composable printing member in infrared-absorbing material, exposing said composable printing member and indicia to a source of infrared radiation to form a substantially insoluble solid solution of said polymer dispersion in areas in thermal contact with said indicia, and removing the coating from said composable printing member in areas not in thermal contact with the indicia to leave a relief printing image corresponding to the applied indicia.

11. A method of preparing a relief printing plate comprising, coating a first substrate with a heat-sensitive, nonnear-infrared-absorbing dispersion resin composition, gelling the dispersion resin composition to form a dry stable coating having a thickness in the range of 0.002–0.010 inch, depositing infrared absorbing indicia on a second substrate, assembling said first substrate and second substrate with said indicia in physical and thermal contact with said heat-sensitive dispersion resin composition, exposing the assembled substrates to a source of near-infrared radiation to form a substantially insoluble solid solution of the dispersed resin in areas in thermal contact with said indicia, separating the first and second substrates, and removing the portions of the resin dispersion not in contact with the indicia, to form a relief printing plate.

* * * * *